Oct. 29, 1935.  K. ZWICK  2,018,697

PANTOGRAPH ENGRAVING AND COPYING MACHINE

Filed Dec. 6, 1932

Inventor
Kurt Zwick
By Edward H Cumpston
his Attorney

Patented Oct. 29, 1935

2,018,697

UNITED STATES PATENT OFFICE 2,018,697

PANTOGRAPH ENGRAVING AND COPYING MACHINE

Kürt Zwick, Munich, Germany, assignor to Friedrich Deckel, Munich-Prinz Ludwigshohe, Germany Application December 6, 1932, Serial No. 645,975
In Germany December 12, 1931

14 Claims. (Cl. 90—13.1)

This invention relates to engraving and copying machines of the type in which a pantograph system is used, a cutting tool and a tracing point or stylus being mounted on the pantograph system.

An object of the invention is to provide a generally improved and more satisfactory machine of this character, and particularly one in which heavy cutting may be accomplished with little or no exertion on the part of the operator, irrespective of the direction of the cut.

Another object is the provision of such a machine so arranged that it will not interfere with the normal free guiding of the pantograph system by hand, as for example when placing the finishing touches upon the work.

To these and other ends the invention resides in certain improvements and combinations of parts, all as will be hereinafter more fully described, the novel features being pointed out in the claims at the end of the specification.

In the drawing.

The same reference numerals throughout the several views indicate the same parts.

Engraving and copying machines employing pantograph systems are well known, and many of the features of such machines are not illustrated or described in the present application, but may be constructed in any suitable known manner.

In machines of this character a cutting tool such as a milling or engraving cutter is mounted on the pantograph system, and a tracing stylus is likewise mounted on the pantograph system. The pantograph is so constructed and adjusted that when the stylus is moved over the surface of a pattern or mold the cutting tool will be moved through corresponding movements bearing a fixed ratio to the movements of the stylus. If desired, the pattern may be of the full size desired in the finished work, in which case the pantograph system is adjusted to a one to one ratio so that the cutting tool moves through exactly the same distance as the stylus. Usually, however, a reduction in size is desired, the pattern purposely being made larger than the intended size of the finished work. By suitable adjustment of the pantograph mechanism, in known manner, the cutting tool may be made to move through one-half or any other desired part of each movement of the tracing stylus.

Figure 1:
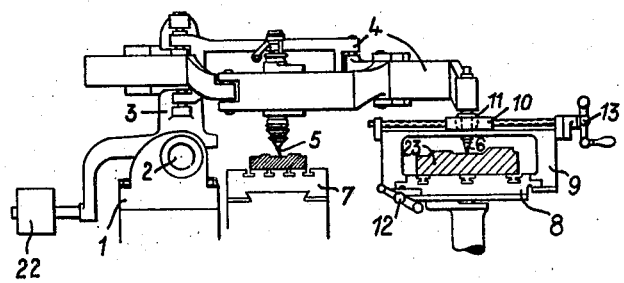
Fig. 1 is a diagrammatic side elevation of part of a machine constructed in accordance with one embodiment of the invention, in which the moving mechanism is controlled by hand.

In the machine illustrated diagrammatically in Fig. 1, there is provided a standard or pedestal 1 having a horizontal axis 2 on which is rotatably mounted the carrier 3 to which is pivoted any suitable known form of pantograph system indicated in general by the numeral 4. This pantograph system carries a cutting tool 5 driven in any suitable manner, as for example by the usual belt drive which is omitted from the drawing for the sake of greater clarity. The pantograph system also carries the tracing point or stylus 6 movable over the surface of the pattern to be reproduced. The work table 7 is supported from the pedestal 1 in any suitable manner, as is also the model or pattern table 8.

When heavy cutting is necessary, as for example in engraving a deep hollow or the like, a relatively great horizontal force must be exerted on the stylus in order to make reasonably rapid progress. The continued exertion of such a force directly by hand in the usual manner is extremely fatiguing to the operator, and results not only in tiring him, but also in reducing his efficiency so that the quality of the finished work is lowered. So far as is known, it has always heretofore been necessary to move the stylus directly by hand in at least some directions, and mechanism has not been provided for moving the stylus in all directions. Obviously, in a complicated pattern, heavy cutting may be necessary in several different directions so that mechanism for moving the stylus only in one direction would not be completely satisfactory and much of the fatigue of the operator would not be eliminated.

According to the present invention, mechanism is provided for moving the stylus in all horizontal directions without fatigue and without the application of direct manual force to the stylus. To this end, a slide 9 is movably mounted on the pattern table 8, this slide being somewhat in the nature of a bridge straddling and extending over the pattern 23 as plainly shown in Fig. 1. The slide is mounted for substantially horizontal movement along guideways at the front and back edges of the pattern table 8, and may be moved along these guideways with little or no exertion by means of the hand operated feeding screw 12.

Mounted in guideways on this slide or bridge 9 is a second slide 10 movable likewise in a substantially horizontal plane in a direction transverse to the direction of movement of the bridge 9. Preferably the slide 10 is movable in a direction from front to back of the machine, that is, in a direction at right angles to the movement of the slide 9. The slide 10 is movable with little or no exertion by the hand feeding screw 13.

By the use of one or both of the screws 12 and 13, as may be necessary, the slide 10 may obviously be moved in any desired direction over the pattern 23, all with very slight exertion on the part of the operator because of the great mechanical advantage obtained through the feeding screws. The slide 10 is suitably connected to the stylus 6 so that the movements of the slide cause corresponding movements of the stylus, thus making it unnecessary for the operator to apply manual force directly to the stylus, especially in heavy cutting operations.

In order to permit the stylus to tilt relatively to the slide 10, the connection between the stylus and the slide is preferably in the form of a universal joint, such, for example, as a ball and socket joint. To this end the slide 10 may be provided with a spherical socket in which is rotatably mounted a ball 11 having a vertical bore or opening through it for receiving the stylus 6, a cylindrical portion of the stylus being slidable up and down vertically through the ball. Thus, as the stylus is moved over the surface of the pattern 23, it may move up and down to conform to the irregularities of the pattern, by sliding through the opening in the ball 11, and the tilting of the stylus caused by such up and down movement is allowed by the rotation or tilting of the ball in its socket. During these up and down movements, the pantograph system 4 and the carrier 3 oscillate about the horizontal axis 2 in known manner.

No mechanism is ordinarily needed for moving the stylus in a vertical direction, since it is usually kept pressed down on the surface of the pattern by the weight of the pantograph system and associated parts, counterbalanced in part by the counterweight 22. When it is desired to have the stylus press more heavily on the pattern, the counterweight 22 can be moved closer to the axis 2.

The bridge slide 9 is so constructed that it may be readily removed from the pattern table 8, as for example by loosening a catch holding the feeding screw 12 and then moving the bridge 9 off the ends of its guideways. When the bridge has been removed, after lifting the stylus 6 out of the ball 11, the stylus is then free for manual actuation in the usual manner, by direct manual force applied to the stylus, and it may be operated in this usual manual way for doing very fine work or for putting the finishing touches upon work.

Figure 2:
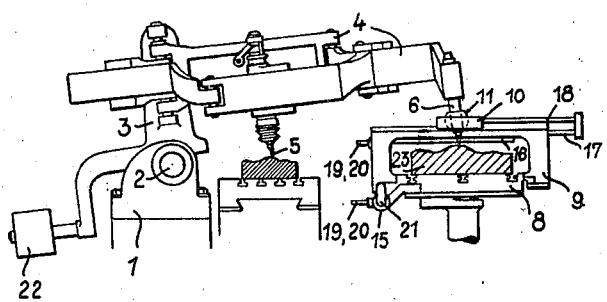
Fig. 2 is a similar view showing another embodiment in which the moving mechanism is operated by fluid pressure cylinders.
Figure 3:
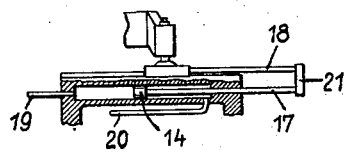
Fig. 3 is a view of a fragment of the apparatus shown in Fig. 2, in vertical section, illustrating the construction of one of the fluid pressure cylinders.

In Fig. 2 there is shown another embodiment of the invention substantially the same as that illustrated in Fig. 1, except that fluid pressure cylinders (preferably hydraulic) are used for moving the slides instead of the manual screw feeds 12 and 13. In place of the screw 12, a fluid pressure cylinder 15 may be provided for moving the bridge 9 along its guideway. Another fluid pressure cylinder 16 is mounted on the bridge 9 for moving the slide 10. Each cylinder may have within it a piston 14 (Fig. 3) coupled to the appropriate slide in any suitable manner, as for example by the piston rod 17, the rod 18, and the connecting piece 21 connecting the rods 17 and 18 to each other. Both cylinders are operated preferably hydraulically and are supplied with suitable fluid through the conduits 19 and 20 leading to any suitable pump or reservoir, the fluid being controlled in any suitable known manner by controls conveniently accessible to the operator. If desired, any known form of reversing device can be applied to the fluid pressure cylinders so that when the pistons reach a certain position, their movements are automatically reversed.

As in the case of the hand operated mechanism of Fig. 1, the fluid pressure operated mechanism of Fig. 2 is likewise readily removable from the machine so that the stylus 6 may be operated directly by hand for the final finishing operations. The removal may be accomplished, for example, by detaching the coupling piece 21 of the cylinder 15 and then moving the bridge 9 longitudinally off the ends of its guideways.

Fig. 2 illustrates stylus 6 engaged with a relatively high point of the pattern 23 and shows the consequent tipping of the entire pantograph system around the axis 2, in comparison to the lower position illustrated in Fig. 1.

It will be readily seen from the foregoing description that mechanism is provided for moving the stylus in any desired direction over the surface of the pattern, and thus no matter in what direction the heavy cuts must be made, they can be accomplished without substantial physical exertion on the part of the operator.

I claim:

1. A copying and engraving machine comprising a pantograph system, a cutting tool mounted on said pantograph system, a pattern table, a tracing stylus also mounted on said pantograph system for cooperation with the surface of a pattern held by said pattern table, mechanism for feeding said stylus in one direction over the surface of the pattern, mechanism for feeding said stylus also in another direction transverse to said first mentioned direction, and means connecting said stylus to said feeding mechanism, said means being arranged so that it may be readily disconnected from said stylus to free said stylus for unhampered movement by hand.

2. A copying and engraving machine comprising a pantograph system, a cutting tool mounted on said pantograph system, a pattern table, a tracing stylus also mounted on said pantograph system for cooperation with the surface of a pattern held by said pattern table, screw feed means for moving said stylus in one direction over the surface of the pattern, other screw feed means for moving said stylus over said surface in another direction transverse to said first mentioned direction, and means connecting said stylus to said feed means, said connecting means being arranged so that it may be readily disconnected from said stylus to free said stylus for unhampered movement by hand.

3. A copying and engraving machine comprising a pantograph system, a cutting tool mounted on said pantograph system, a pattern table, a tracing stylus also mounted on said pantograph system for cooperation with the surface of a pattern held by said pattern table, fluid pressure means for moving said stylus in one direction over the surface of the pattern, other fluid pressure means for moving said stylus over said surface in another direction transverse to said first mentioned direction, and means connecting said stylus to said fluid pressure means, said connecting means being arranged so that it may be readily disconnected to allow said tracing stylus and pantograph system to be shifted freely by hand.

4. A copying and engraving machine comprising a pantograph system, a cutting tool mounted on said pantograph system, a tracing stylus also mounted on said pantograph system for cooperation with the surface of a pattern to be copied, a support for said pattern to be copied, a slide detachably mounted on said support for movement in one direction, a second slide mounted on said first mentioned slide for movement in a direction transverse to the direction of movement of the first mentioned slide, means for moving said second slide relatively to said first mentioned slide, and readily detachable means for operatively connecting said stylus to said second slide to be moved thereby, so that said slides may be readily disconnected from said stylus and removed from said support to free said stylus for unimpeded movement by hand.

5. A copying and engraving machine comprising a pantograph system, a cutting tool mounted on said pantograph system, a tracing stylus also mounted on said pantograph system for cooperation with the surface of a pattern to be copied, a support for said pattern to be copied, a bridge extending across said pattern and slidably mounted on said support for movement in one direction, a slide mounted on said bridge for movement in a direction transverse to the direction of movement of said bridge, means for moving said slide relatively to said bridge, and means for operatively connecting said stylus to said slide to be moved thereby.

6. A copying and engraving machine comprising a pantograph system, a cutting tool mounted on said pantograph system, a tracing stylus also mounted on said pantograph system for cooperation with the surface of a pattern to be copied, a stylus guiding slide movable substantially in a plane, and a universal joint connection between said slide and said stylus so that said stylus may tilt relatively to the plane of movement of said slide.

7. A copying and engraving machine comprising a pantograph system, a cutting tool mounted on said pantograph system, a tracing stylus also mounted on said pantograph system for cooperation with the surface of a pattern to be copied, a stylus guiding slide movable substantially in a plane, and a ball and socket connection between said slide and said stylus so that said stylus may tilt relatively to the plane of movement of said slide.

8. A copying and engraving machine comprising a pantograph system, a cutting tool mounted on said pantograph system, a tracing stylus also mounted on said pantograph system for cooperation with the surface of a pattern to be copied, a stylus guiding slide movable substantially in a plane, a spherical socket in said slide, and a ball rotatable in said socket, said ball having an opening therethrough for receiving said stylus so that the stylus may move longitudinally through said ball in a direction transverse to the plane of movement of said slide and may tilt relatively to said plane by turning said ball in its socket.

9. A copying and engraving machine comprising a work support, a separate pattern support, a pantograph system, a cutting tool mounted on said pantograph system for cooperation with work on said work support, a tracing stylus also mounted on said pantograph system for cooperation with a pattern on said pattern support, feeding mechanism removably mounted on said pattern support, and means connecting said stylus to said feeding mechanism, so that said stylus may be moved by said feeding mechanism during preliminary operations, said connecting means being so arranged that said mechanism may be detached from said stylus and removed from said pattern support to enable free movement of said pantograph system by hand during finishing operations.

10. A copying and engraving machine comprising a work support, a separate pattern support, a pantograph system, a cutting tool mounted on said pantograph system for cooperation with work on said work support, a tracing stylus also mounted on said pantograph system for cooperation with a pattern on said pattern support, feeding mechanism removably mounted on said pattern support and movable in each of two substantially horizontal directions at an angle to each other, and means connecting said feeding mechanism to said stylus to impart substantially horizontal movements of said feeding mechanism to said stylus, said stylus being movable vertically independently of said feeding mechanism, and said connecting means being arranged so that said feeding mechanism may be disconnected from said stylus to enable free movement of said stylus and said pantograph system by hand when desired.

11. A copying and engraving machine comprising a pattern holding table, guideways on said table extending in one direction, a pantograph system, a tracing stylus mounted on said pantograph system for cooperation with the surface of a pattern held on said table, said tracing stylus being freely movable by hand, when desired, in any direction over the surface of said pattern, a cutting tool also mounted on said pantograph system and movable therewith in accordance with movements of said stylus, a first slide removably mounted on said guideways and movable back and forth along said guideways when in operating position thereon, guideways on said first slide extending in a direction transverse to the direction of the guideways on said table, a second slide mounted on the guideways on said first slide for movement back and forth along said guideways, a readily detachable connection between said second slide and said stylus, and mechanism for moving said first slide along the guideways on said table and for moving said second slide along the guideways on said first slide, to move said stylus over the surface of said pattern otherwise than by free hand movement.

12. A copying and engraving machine comprising a pattern holding table, guideways on said table extending in one direction, a pantograph system, a tracing stylus mounted on said pantograph system for cooperation with the surface of a pattern held on said table, said tracing stylus being freely movable by hand, when desired, in any direction over the surface of said pattern, a cutting tool also mounted on said pantograph system and movable therewith in accordance with movements of said stylus, a first slide removably mounted on said guideways and movable back and forth along said guideways when in operating position thereon, guideways on said first slide extending in a direction transverse to the direction of the guideways on said table, a second slide mounted on the guideways on said first slide for movement back and forth along said guideways, a readily detachable connection between said second slide and said stylus, and mechanism for moving said first slide along the guideways on said table and for moving said second slide along the guideways on said first slide, to move said stylus over the surface of said pattern otherwise than by free hand movement, said slides being connected to said pantograph system only through said stylus, so that when said stylus is disconnected from said second slide, said pantograph system may be moved entirely independently of said slides.

13. A copying and engraving machine comprising a pattern holding table, guideways on said table extending in one direction, a pantograph system, a tracing stylus mounted on said pantograph system for cooperation with the surface of a pattern held on said table, said tracing stylus being freely movable by hand, when desired, in any direction over the surface of said pattern, a cutting tool also mounted on said pantograph system and movable therewith in accordance with movements of said stylus, a first slide removably mounted on said guideways and movable back and forth along said guideways when in operating position thereon, guideways on said first slide extending in a direction transverse to the direction of the guideways on said table, a second slide mounted on the guideways on said first slide for movement back and forth along said guideways, a readily detachable connection between said second slide and said stylus, fluid pressure means for moving said first slide along the guideways on said table, and fluid pressure means for moving said second slide along the guideways on said first slide, to move said stylus over the surface of said pattern.

14. A copying and engraving machine comprising a pattern holding table, guideways on said table extending in one direction, a pantograph system, a tracing stylus mounted on said pantograph system for cooperation with the surface of a pattern held on said table, said tracing stylus being freely movable by hand, when desired, in any direction over the surface of said pattern, a cutting tool also mounted on said pantograph system and movable therewith in accordance with movements of said stylus, a first slide removably mounted on said guideways and movable back and forth along said guideways when in operating position thereon, guideways on said first slide extending in a direction transverse to the direction of the guideways on said table, a second slide mounted on the guideways on said first slide for movement back and forth along said guideways, a readily detachable connection between said second slide and said stylus, screw feed means for moving said first slide along the guideways on said table, and screw feed means for moving said second slide along the guideways on said first slide, to move said stylus over the surface of said pattern.

KURT ZWICK.

CERTIFICATE OF CORRECTION.

Patent No. 2,018,697.　　　　　　　　　　　　　　　　　　　October 29, 1935

It is hereby certified that the name of the patentee in the above numbered patent was erroneously written and printed as "Kurt Zwick" whereas said name should have been written and printed as Kurt Zwick; and that the said Letter Patent should be read with this correction therein that the same may confor to the record of the case in the Patent Office.

Signed and sealed this 3rd day of March, A. D. 1936.

(Seal)

Leslie Frazer
Acting Commissioner of Patents.